Aug. 1, 1967  R. G. FLAGAN  3,334,007
PANEL CONSTRUCTION WITH A HEAT CURED ADHESIVE SECURING MEANS
Filed June 11, 1963

INVENTOR.
Robert G. Flagan
BY
Harness, Dickey & Pierce.
ATTORNEYS.

United States Patent Office 3,334,007
Patented Aug. 1, 1967

3,334,007
PANEL CONSTRUCTION WITH A HEAT CURED
ADHESIVE SECURING MEANS
Robert G. Flagan, Grosse Pointe Park, Mich., assignor to
Fruehauf Corporation, a corporation of Michigan
Filed June 11, 1963, Ser. No. 287,046
1 Claim. (Cl. 161—123)

This invention relates generally to panel constructions and more particularly to an improved means for securing vertical posts to the side and end walls of shipping containers, highway trailers and the like.

Rapid advances in the adhesive art, for example, epoxy and rubber based adhesives, have opened up entirely new industrial applications for such adhesives. For example, such adhesives are sufficiently strong to be substituted for riveted and welded constructions in many applications.

However, a problem has developed in the use of such adhesives in that they exhibit critical thickness characteristics. If for example, a pair of generally flat members are bonded to one another in an angular relationship, the attendant variation in adhesive thickness results in wide stress variations in the adhesive. Obviously high stress areas will fail first, and because, such adhesives generally require relatively large surface to surface contact areas, failure of one portion of the adhesive eventually will lead to failure of the entire bonded structure.

The problem is solved, in accordance with the instant invention, by the provision of spaced ribs or beads on one of the structural members that are bonded together. The ribs define one or more recesses of uniform depth for the acceptance of the adhesive. In this manner adhesive thickness is positively controlled.

Another problem that has arisen in the use of the aforesaid adhesives is that curing must be carefully controlled. This problem is also solved by the ribs on one of the members which, in addition to defining the adhesive thickness, function as heat transfer paths between the structural members. Thus, upon application of heat to one side of the bonded assembly as by, for example, heat lamps, heat is conducted through the ribs to the opposite or blind side of the panel so that opposite sides of the adhesive layer are relatively uniformly cured.

Accordingly, one object of the instant invention is an improved panel construction that results in predictable and controlled strength characteristics.

Another object of the instant invention is an improved means for controlling adhesive thickness between two structural members.

Another object is a means for effecting heat transfer between a pair of adhesively bonded members to control the cure of an adhesive therebetween.

Other objects and advantages of the instant invention will be apparent in the following specification, claim and drawings, wherein:

Figure 1:
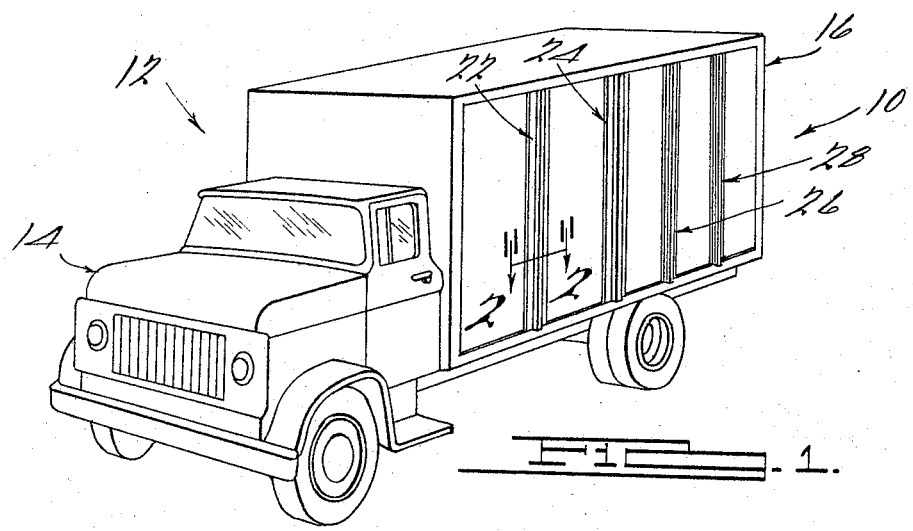
FIGURE 1 is a perspective view of a highway vehicle having a load carrying van utilizing panels made in accordance with the instant invention.
Figure 2:
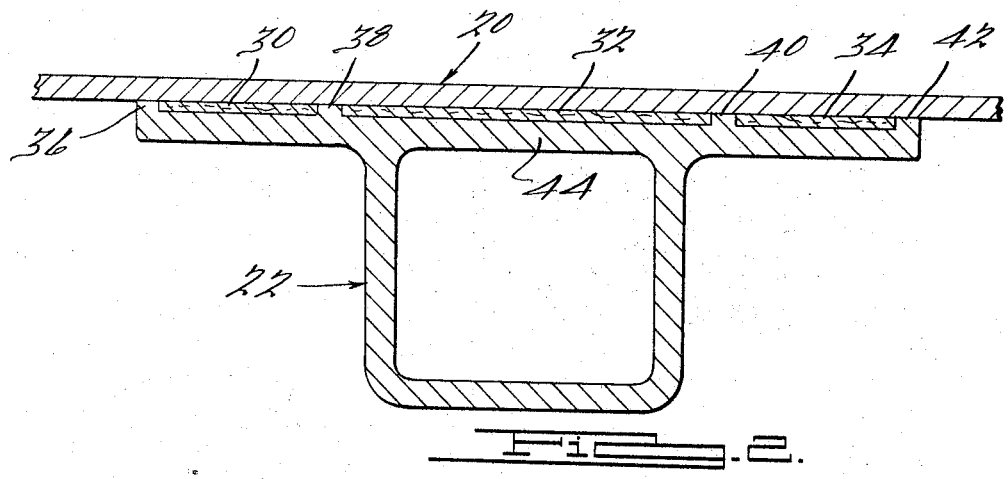
FIGURE 2 is a cross-sectional view taken substantially along the line 2—2 of FIGURE 1.

An improved panel construction 10 is shown in conjunction with a truck 12. The truck 12 compises a chassis 14 of conventional construction for the support of a generally rectangular van 16.

A panel construction 10, in accordance with the instant invention, comprises a side wall skin 20 having a plurality of vertically extending posts 22, 24, 26, and 28 bonded thereto as by an adhesive. The post 22, which is exemplary of the posts 24, 26, and 28, is secured to the skin panel 20 by three portions of adhesive 30, 32, and 34.

In accordance with the instant invention the thickness of the adhesive layers 30, 32, and 34 is defined by a plurality of ribs 36, 38, 40, and 42 on the post 22. Because the post 22 contacts against the skin 20 only at the ribs 36, 38, 40, and 42, canting of the post 22 relative to the skin 20 and attendant variation in the thickness of adhesive is precluded. A thickness of .020 inch has been found to be satisfactory for the adhesive layers 30, 32, and 34.

In accordance with another feature of the instant invention, the ribs 36, 38, 40, and 42 form heat transfer paths, respectively, between the skin 20 and a flange 44 of the post 22 so that heat applied to, for example, the skin 20 by heat lamps internally of the van 16 (not shown), is transferred to the flange 44 of the post 22. In this manner curing of the adhesive layers 30, 32, and 34 is effected from both sides thereof.

Figure 3:
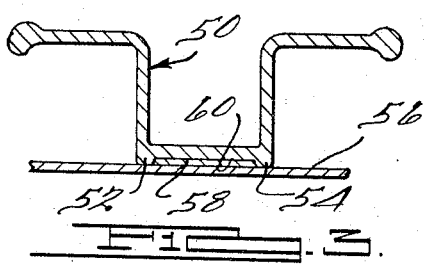
FIGURE 3 is a cross-sectional view similar to FIG. 2 showing another embodiment of the instant invention.

As seen in FIGURE 3 of the drawing, a modified post 50 has a pair of ribs 52 and 54 thereon that engage a skin 56. An adhesive layer 58 is accepted in a recess 60 defined by the ribs 52 and 54, the thickness thereof being controlled by the height of the ribs 52 and 54. The ribs 52 and 54 also define a heat transfer path between the post 50 and skin 56 to evenly heat and cure the adhesive 58.

From the foregoing description it should be apparent that the rib construction on at least one of a pair of members that are bonded by an adhesive effects positive control of the thickness of the adhesive layer. Stress variations in the adhesive due to the thickness variation are precluded. Also the ribs insure proper curing of the adhesive due to relatively even heat distribution between the bonded members.

It is to be understood that the specific panel construction herein disclosed and described is presented for the purpose of explanation and illustration and is not intended to indicate limits of the invention, the scope of which is defined by the following claim.

What is claimed is:

In a panel construction comprising a pair of metal members bonded to one another by an adhesive, the improvement comprising, a first member having a planar surface, a pair of spaced relatively narrow and low substantially flat planar faced heat transfer ribs of equal height extending from the planar surface of said first member, a plane containing the flat planar faces on said ribs extending in parallel relation to the planar surface on said first member, and a second member having a planar surface, the ribs on said first member being directly engaged with the planar surface on said second member so that said planar surfaces are orientated in closely spaced parallel relationship thereby forming a channel with opposed closely spaced planar parallel walls, and a heat cured adhesive disposed in said channel with said adhesive being of a uniform thickness defined by the height of the ribs on said first member, the ribs on said first member defining a heat transfer path between said members facilitating even curing of said adhesive.

References Cited

UNITED STATES PATENTS

| 2,490,577 | 12/1949 | Brown | 52—393 X |
| 2,575,558 | 11/1951 | Newey | 260—32.6 |
| 2,772,936 | 12/1956 | Bargen | 52—629 |
| 3,140,538 | 7/1964 | Rutledge | 29—483 X |
| 3,202,596 | 8/1965 | Canevari | 156—153 |

OTHER REFERENCES

Modern Plastics, October 1952.
Popular Science, November 1944, pages 74–78.

FRANK L. ABBOTT, *Primary Examiner.*

R. W. COOKE, *Examiner.*

M. O. WARNECKE, *Assistant Examiner.*